United States Patent Office 2,908,675
Patented Oct. 13, 1959

2,908,675
RECOVERY PROCESS FOR POLYETHYLENE

Kaare Paul Lindland, Wilmington, Del., assignor to E. I. du Pont de Nemours and Company, Wilmington, Del., a corporation of Delaware No Drawing. Application May 1, 1957
Serial No. 656,203

6 Claims. (Cl. 260—94.9)

This invention relates to an improved method for separating hydrocarbon polymer from mixtures produced by the polymerization of a terminally unsaturated olefin in the presence of catalysts which are formed by admixing a halide of a transition element such as titanium with a metal-containing reducing agent, such as an organometallic compound, a metal hydride or an active metal.

It has recently been discovered that the products obtained from reacting compounds, and preferably halides, of transition elements such as titanium, vanadium, molybdenum found in groups IV B, V B, and VI B of the periodic table of elements with metallic reducing agents such as metal alkyls, metal hydrides and alkali metals, are extremely active polymerization catalysts, which will polymerize ethylene at low pressure and temperatures to a high molecular weight polymer relatively free from branching. These catalysts have been referred to as coordination catalysts, since it is believed that the reduced transition element forms coordinate bonds with ethylene and thereby causes polymerization of ethylene to linear polymers of unique properties. The activity of coordination catalysts is such that they also polymerize terminally unsaturated olefins such as propylene and butene and homologs thereof to high molecular weight solids, which are useful as plastics.

The process employed to polymerize terminally unsaturated hydrocarbons by coordination catalysts may be carried out over a wide range of conditions. Thus, reaction temperatures may be varied from below 0° to above 250° C. and pressures may be varied from atmospheric pressure to pressures exceeding 1000 atmospheres. Generally, the polymerization is carried out in the presence of an inert, liquid, hydrocarbon medium containing the catalyst.

The coordination catalysts, however, have the disadvantage of leaving metallic residues intimately admixed with and possibly bonded to the polymer. If these catalyst residues are not removed from the polymer, degradation and discoloration of the polymer will occur when the polymer is heated. Such degradation and discoloration is extremely undesirable where polymers are melt fabricated and it is therefore necessary to remove the metallic catalyst residues as completely as possible. Furthermore, the catalyst residues retained in the polymer will cause the corrosion of process equipment employed in the fabrication of the polymer. While it had been found, heretofore, that alcoholysis of the polymer obtained from coordination catalysts will cause the breaking of the metal to polymer bond and will also cause the solvolysis of the metal, there has, nevertheless, arisen a need for further improvements in the purification of polymers to remove remaining residues of the metallic catalyst in order to improve the quality of the resulting product.

In accordance with the present invention it has been discovered that metallic catalyst residues obtained in the polymerization of ethylene with a coordination catalyst can be effectively removed by a process which comprises reacting at a temperature above 125° C. an aqueous dispersion of colloidal hydrated silica with a polymerization mixture comprising a liquid hydrocarbon medium, a dissolved polymer of ethylene, and coordination catalyst residues, containing a transition element, and thereafter filtering the said reaction mixture.

Although the process of the present invention is described in terms of an ethylene polymerization process, it is equally well applicable to a process for the polymerization of propylene, and homologs thereof and to the interpolymerization of terminally unsaturated hydrocarbon monomers with ethylene. Thus, catalyst residues obtained from the polymerization of terminally unsaturated olefins with a coordination catalyst may be readily removed from a solution of the polymer by reaction with an aqueous hydrated silica sol followed by filtration.

The catalyst residues removed by the process of the present invention are those obtained from the polymerization of ethylenically unsaturated compounds with a coordination catalyst formed by admixing a salt and preferably a halide of a transition element selected from group IV B, V B, and VI B of the periodic table of elements as illustrated in the Handbook of Chemistry and Physics, Chemical Rubber Publishing Company, 37th edition, page 392, with an organometallic reducing agent having at least one hydrocarbon radical bonded to metal such as metal alkyls and Grignard reagents. In place of the organometallic reducing agents, metal hydrides and alkali metals may also be employed as reducing agents.

As stated hereinabove, the polymerization of ethylene with a coordination catalyst comprising the product formed from the reaction of a transition metal halide such as titanium, vanadium or zirconium with a metallic reducing agent such as a metal alkyl or metal aryl, a Grignard reagent, a metal hydride or an alkali metal is extremely reactive and may be carried out over a wide range of conditions. The preferred process, however, is one in which the polymer is formed as a solution in the inert hydrocarbon reaction medium. The polymer becomes sufficiently soluble in a hydrocarbon medium if the temperature is maintained above the melting point of the polymer; that is, approximately above 125° C. Such a process allows a good control over the polymerization and results in a product of improved quality. Although the present invention is especially adapted to such a process, it may also be applied to processes in which the polymerization is carried out at temperatures below the melting point of the polymer, but an additional step of heating the polymerization product until a solution of the polymer is achieved is required.

The product obtained from the polymerization of ethylene with a coordination catalyst at temperatures above 125° C. in the presence of an inert liquid hydrocarbon comprises the inert liquid hydrocarbon, dissolved unreacted monomer, dissolved polymer and the catalyst residues which may exist in the form of an insoluble complex or may be bonded to the polymer. It was discovered that aqueous sols of colloidal hydrated silica react with the catalyst residues and cause the formation of a granular, coarse precipitate which can be readily removed from the polymer solution by filtration. The use of methanol, water, carboxylic acids and amines when used in small quantities cause the formation of gelatinous, fine precipitates which are not filterable. When used in large excess these compounds cause the precipitation of the polymer and to a certain extent the coprecipitation of the catalyst residue although some of the catalyst residues become soluble in the added solvent. The colloidal hydrated silica sols employed in the present invention are commercially available under the trademark "Ludox." The concentration of the hydrated silica in the aqueous phase is not critical and generall varies from 10 to 30%.

On addition of the aqueous silica sol to the polymer solution, the water of the sol reacts with the metallic catalyst residues to form insoluble metal hydroxides. Simultaneously, the immiscible silica sol droplets will be dehydrated because the water of the sol is appreciably soluble in the polymer solvent at the elevated temperatures. The removal of the aqueous phase from the sol will cause gelling of the hydrated silica. In gelling the hydrated silica adsorbs and agglomerates the reacted catalyst residue. Since the gelling occurs at elevated temperatures siloxane bridges are formed between the primary silica particles and further the catalyst residues are believed to react with silanol groups to form oxygen-metal-oxygen bonds between the primary silica particles. As a result of the latter two reactions described here, sand-like granules containing the metallic catalyst residues are formed. These granules having an average diameter of greater than 100 microns are readily filtered. The removal of the catalyst residues with the hydrated silica sol is better than 99%.

The quantity of the hydrated colloidal silica sol added to the polymer solution containing the metallic catalyst residues may be greatly varied depending on the concentration of the metallic catalyst residue, the particle size desired in the agglomerate, and the type of agitation employed during the agglomeration period. In general, the quantity of the hydrated silica gel should exceed the quantity of the catalyst at least 10 fold. As the quantity of the hydrated colloidal silica sol is increased, the average particle size of the granular precipitate is increased. The upper limit of the quantity of the sol to be added to the polymer solution will depend on the concentration of the polymer in the solvent, since the addition of a quantity of water large enough to cause formation of a second phase must be avoided. However, a wide range of quantities remains available in which the metallic catalyst residues can be removed without causing the polymer to precipitate out of solution. The optimum concentration in each particular polymer solution to be purified is readily determined by testing samples of the catalyst in the solvent in the absence of the polymer.

Various means known in the art may be employed to filter the granular precipitate from the polymer solution. Thus it is possible to employ filters having pores of less than 50 microns such as a 300 mesh screen or it is possible to pass the polymer solution through a bed packed with a filter aid and/or adsorbent such as silica.

The thus treated liquid is essentially free from inorganic residues and contains principally only polymer in addition to solvent and residual monomer. At a result, the polymer can be separated from the solution by distillation of the solvent, leaving the molten polymer as a residue. The molten polymer may then be cooled off or fed into a melt extruder to be extruded into any desirable shape, such as sheets, ribbons or rods. One method of polymer separation comprises the addition of solvents such as methanol in sufficient quantities, generally from 30 to 50% by weight of the polymer solution, to cause precipitation of the high molecular weight polymer. The precipitated polymer, solvent and alcohol is passed into a settler maintained at a temperature above the melting point of the polymer. The molten polymer settles and can be continuously removed at the bottom, while solvent and alcohol are removed from the top. In another method, the polymer solution is heated to above the critical temperature at sufficient pressure to maintain a uniform polymer-solvent vapor phase. This mixture is then passed through a pressure let-down valve into a pressure separation vessel, where the pressure is sufficiently reduced to cause the separation of the molten polymer which is then removed. This method has the advantage of removing any low molecular weight greases from the high molecular weight polymer.

The process of the present invention is carried out at temperatures above 125° C. and preferably at temperatures of 125° C. to 300° C. Since the hydrocarbon solvents employed as reaction media such as cyclohexane, n-decane, benzene and toluene have boiling points which are below the temperatures employed in the purification of the polymer, it is necessary to operate the process under sufficient positive pressure to maintain the hydrocarbon solvents employed as reaction media in the liquid phase. The minimum pressures required will vary with the solvents employed. Beyond the pressure necessary to maintain the polymer in solution and the solvent in the liquid phase, the pressure is not critical. Generally, it was found that pressures in the range of 1000 p.s.i. to 3000 p.s.i. are well suited to maintain the solvents employed in the liquid phase.

The process of the present invention is further illustrated by the following examples:

Example I

A 7% polyethylene solution was prepared by continuously reacting at a temperature of 250° C. and a pressure of 2500 p.s.i., 5.0 lb./per hour of ethylene with a catalyst formed by admixing in situ 11.3 millimoles/hr. of titanium tetrachloride and 3.7 millimoles/hr. of vanadium oxytrichloride with 33 millimoles/hr. of aluminum triisobutyl in 56 lb./hr. of cyclohexane. The resulting polymer solution was passed into a 2000 ml. stainless steel vessel maintained at 225° C. and at a pressure of 1900 p.s.i. at a rate of 61.1 lb./hr. There it was admixed under violent agitation with an aqueous dispersion containing 25% hydrated, colloidal silica at the rate of 225 ml./hr. The resulting reaction mixture was passed through a filtration column 6" in diameter and 7" long containing as a filter bed, silica gel particles ranging from 200 mesh at the top to 14 mesh at the bottom which was maintained at a pressure of 1600 p.s.i. and 210° C. The effluent from the filtration column was passed into a solvent separation vessel where the solvent was flashed off by reducing the pressure of the system to atmospheric pressure. The resultant polymer was analyzed for ash content which was found to be 70–80 p.p.m. The theoretical ash content of the polymer, which would have been obtained in the absence of catalyst removal was 1430 p.p.m. Removal of the catalyst was 95% complete.

Example II

A catalyst mixture comprising 4 millimoles of aluminum triisobutyl (122 p.p.m. Al), 1.5 millimoles of titanium tetrachloride (82 p.p.m. Ti) and 0.5 millimole vanadium oxytrichloride (29 p.p.m. V) in one liter of primol-D (empirical formula $C_{30}H_{57}$) was heated to 220° C. A black suspension resulted consisting of very fine particles. To 500 ml. of this mixture was gradually added with agitation, 3 ml. of a hydrated, colloidal silica containing 30% $SiO_2$ (commercially available as "Ludox" HS) at a temperature of 110° C. The mixture was heated to 200° C., then cooled to 150° C. and filtered through a 40 micron fritted disc filter. The filtration rate was very fast and the filtrate was water clear. The particle size distribution was determined by screening the dried precipitate and found to be

| | Percent |
|---|---|
| On 50 mesh screen (>300 mu) | 18.7 |
| On 100 mesh screen (>150 mu) | 40.6 |
| On 200 mesh screen (>76 mu) | 29.9 |
| On 300 mesh screen (>46 mu) | 9.1 |
| Through 300 mesh screen (<46 mu) | 1.5 |

Density of solids: 2.2 g./ml. Metal analyses of filtrates show 0.5 p.p.m. Al, <1 p.p.m. Ti and <1 p.p.m. V. Thus, the removal of metallic residues was better than 99%.

Example III

To 500 ml. of a catalyst mixture prepared as in Example I was added gradually with agitation 3 ml. of an aqueous colloidal hydrated silica sol containing 15% SiO₂ (commercially available as "Ludox" SM). Using the same procedure as in Example II, the following results were obtained:

| | Percent |
|---|---|
| On 50 mesh screen | 52.1 |
| On 100 mesh screen | 33.7 |
| On 200 mesh screen | 11.7 |
| On 300 mesh screen | 2.2 |
| Through 300 mesh screen | 0.2 |

The analysis of metals in the filtrate showed 1 p.p.m. Al, <0.5 p.p.m. Ti and <1 p.p.m. V, representing better than 99% removal.

*Example IV*

A catalyst mixture comprising 0.4 millimole Al(iBu)₃ (12.2 p.p.m. Al) 0.15 millimole TiCl₄ (8.2 p.p.m. Ti) and 0.02 millimole VOCl₃ (0.3 p.p.m. V) was used, but otherwise the procedure was exactly the same as described in Example II. One milliliter of the hydrated colloidal silica was added to this catalyst mixture. Analysis of filtrate showed: <0.5 p.p.m. Al, <0.5 p.p.m. Ti and 0.5 p.p.m. V. Thus, the removal of catalyst residues was at least 93% efficient.

*Example V*

A coordination catalyst was prepared by reducing 2 millimoles of molybdenum pentachloride (270 p.p.m. Mo) with 4 millimoles of tin tetrabutyl (540 p.p.m. Sn) in a solution of one liter Decalin (decahydronaphthalene). The resulting black, colloidal suspension was rendered filterable by adding 6 ml. of an aqueous silica sol, containing 30% SiO₂ ("Ludox" HS) at a temperature of 110° C. and heating the mixture to 180° C. The solids were readily removed by filtration through a 40 micron fritted disc filter. The filtration was very rapid and the filtrate was water clear. Metal analyses of the filtrate showed <5 p.p.m. Sn and <3 p.p.m. Mo. The removal of catalysts, therefore, was better than 99% complete.

*Example VI*

A coordination catalyst was prepared by reacting 2 millimoles of diphenyl magnesium (54 p.p.m. Mg) with 2 millimoles of aluminum triisobutyl (62 p.p.m. Al) and 2 millimoles of titanium tetrachloride (109 p.p.m. Ti) in a solution of one liter Decalin (decahydronaphthalene). The catalyst residues were agglomerated and filtered as described in Example V. The solids filtered readily and the water clear appearance of the filtrate indicated absence of metallic residues. Metal analysis shows the concentration of each metal to be less than 2 p.p.m. Thus, the removal of the catalyst residues was at least 97% efficient.

The process of the present invention equally well removes catalyst residues of coordination catalysts formed from such transition metal compounds as titanium tetrabromides, titanium alkoxides, vanadium tetrachloride, vanadium oxytrichloride, chromium tribromide, tungsten hexachloride, molybdenum pentachloride, zirconium tetrachloride and such metallic reducing agents as alkali metal aluminum alkyls, zinc alkyls, tin tetraalkyls, aryl magnesium chlorides, aluminum hydride, calcium hydride, sodium and potassium.

The process of the present invention is useful in the preparation of hydrocarbon polymers which are substantially free from inorganic catalyst residues where the polymerization involves the use of an organometallic catalyst containing a transition metal in a reduced valence state.

The purified hydrocarbon polymers obtained by using the process of the present invention are greatly improved in stability and color. On melt extrusion and injection molding of ethylene polymers, polymerized with an organometallic catalyst and purified by the present invention, color-free products are obtained. Furthermore, the polymer may be maintained at temperatures above the melting point for long periods of time without being degraded or discolored. The corrosion of process equipment employed in the fabrication of hydrocarbon polymers purified by the present invention is reduced to a minimum.

I claim:

1. A process for removing metallic catalyst residues from a hydrocarbon polymer, said polymer being obtained through the polymerization of a terminally unsaturated olefin with a catalyst, said catalyst being the product obtained on reacting a halide of a transition metal element from the class consisting of group IV B, V B and and VI B of the periodic table of elements, with a metallic reducing agent of the class consisting of metal hydrocarbon compounds, metal hydrides and alkali-metals, which comprises introducing, at a temperature above 125° C. an aqueous colloidal silica dispersion into a polymerization product mixture containing in a liquid inert hydrocarbon medium a dissolved hydrocarbon polymer and a residue of said catalyst, said silica being employed in excess as based on the catalyst quantity, and thereafter filtering said polymer solution at a temperature above 125° C.

2. A process for removing metallic catalyst residues from normally solid polymers of ethylene, said polymer being obtained through the polymerization of ethylene with a catalyst, said catalyst being the product obtained on reacting a halide of a transition metal element from the class consisting of group IV B, V B and VI B of the periodic table of elements, with a metallic reducing agent of the class consisting of metal hydrocarbon compounds, metal hydrides and alkali-metals, which comprises introducing at a temperature of 125° C. to 300° C. an aqueous colloidal hydrated silica dispersion into a polymerization product mixture containing in a liquid inert hydrocarbon medium a dissolved ethylene polymer, and a residue of said catalyst, said silica being employed in excess as based on the catalyst quantity, and thereafter filtering said polymerization mixture at a temperature of 125 to 300° C.

3. The process as set forth in claim 2 wherein the catalyst is the product formed by admixing a titanium halide with an aluminum hydrocarbon compound.

4. The process as set forth in claim 2 wherein the catalyst is the product formed by admixing a titanium halide and a vanadium halide with an aluminum hydrocarbon compound.

5. The process as set forth in claim 2 wherein the liquid hydrocarbon is cyclohexane.

6. The process of removing metallic catalyst residue which comprises introducing an aqueous colloidal hydrated silica dispersion into an ethylene polymerization product mixture, containing an inert liquid hydrocarbon, a normally solid polymer of ethylene and a catalyst mixture formed by admixing a transition metal halide of groups IV to VI of the periodic table of elements with an aluminum hydrocarbon compound, said silica being employed in at least ten fold excess as based on the catalyst quantity, heating the resultant mixture at a temperature of 175 to 225° C. under sufficient pressure to keep the solvent in the liquid phase, filtering said polymerization mixture at a temperature of 125 to 300° C., and recovering a polymer solution essentially free of metallic residues.

References Cited in the file of this patent

FOREIGN PATENTS 533,362     Belgium  ---------------  May 16, 1955

UNITED STATES PATENT OFFICE
CERTIFICATE OF CORRECTION

Patent No. 2,908,675 October 13, 1959

Kaare Paul Lindland

It is hereby certified that error appears in the printed specification of the above numbered patent requiring correction and that the said Letters Patent should read as corrected below.

Column 6, line 20, after "aqueous" insert -- hydrated --.

Signed and sealed this 5th day of April 1960.

(SEAL)
Attest:

KARL H. AXLINE
Attesting Officer

ROBERT C. WATSON
Commissioner of Patents